United States Patent [19]

Hamel et al.

[11] 4,084,943
[45] Apr. 18, 1978

[54] JET MEMBRANE GAS SEPARATOR AND METHOD

[75] Inventors: Bernard B. Hamel, Philadelphia, Pa.; Eric P. Muntz, Pasadena; Paul B. Scott, Topanga, both of Calif.

[73] Assignee: Grumman Aerospace Corporation, Bethpage, N.Y.

[21] Appl. No.: 740,864

[22] Filed: Nov. 11, 1976

Related U.S. Application Data

[63] Continuation-in-part of Ser. No. 461,846, Apr. 18, 1974, abandoned.

[51] Int. Cl.² .............................................. B01D 57/00
[52] U.S. Cl. .......................................... 55/17; 55/277; 55/431
[58] Field of Search ................... 55/17, 218, 277, 406, 55/407, 431; 239/1, 102

[56] References Cited

U.S. PATENT DOCUMENTS

| 825,297 | 7/1906 | Brunck | 55/407 X |
|---|---|---|---|
| 1,137,774 | 5/1915 | Mazza | 55/17 |
| 2,372,316 | 3/1945 | Curtis | 55/17 |
| 3,583,633 | 6/1971 | Campargue | 239/102 |
| 3,616,596 | 11/1971 | Campargue | 55/277 X |
| 3,626,665 | 12/1971 | Fenn et al. | 55/17 |

*Primary Examiner*—Wilbur L. Bascomb, Jr.
*Assistant Examiner*—Robert H. Spitzer
*Attorney, Agent, or Firm*—Harris, Kern, Wallen & Tinsley

[57] ABSTRACT

A method of and apparatus for separating a lighter gas from a heavier gas in a gas mixture. The method involves directing generally annular jets of a jet gas into the gas mixture, and extracting the lighter gas from the gas mixture through central zones of the generally annular jets. The apparatus comprises a jet membrane separating a chamber for the gas mixture and a chamber for the gas enriched in the lighter gas, the jet membrane utilizing annular jet orifices communicating with the gas-mixture chamber and utilizing extraction tubes at the jet orifices and interconnecting the two chambers. A jet gas delivered to the jet orifices is discharged therethrough into the gas-mixture chamber, and the lighter gas of the mixture passes through the extraction tubes into the chamber for the gas enriched in the lighter gas. By cascading a number of jet membrane stages of the foregoing nature, a very high degree of purity for the lighter gas may be achieved.

23 Claims, 9 Drawing Figures

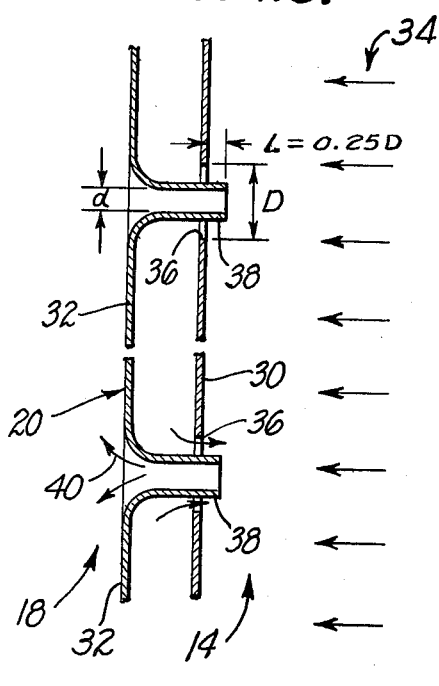
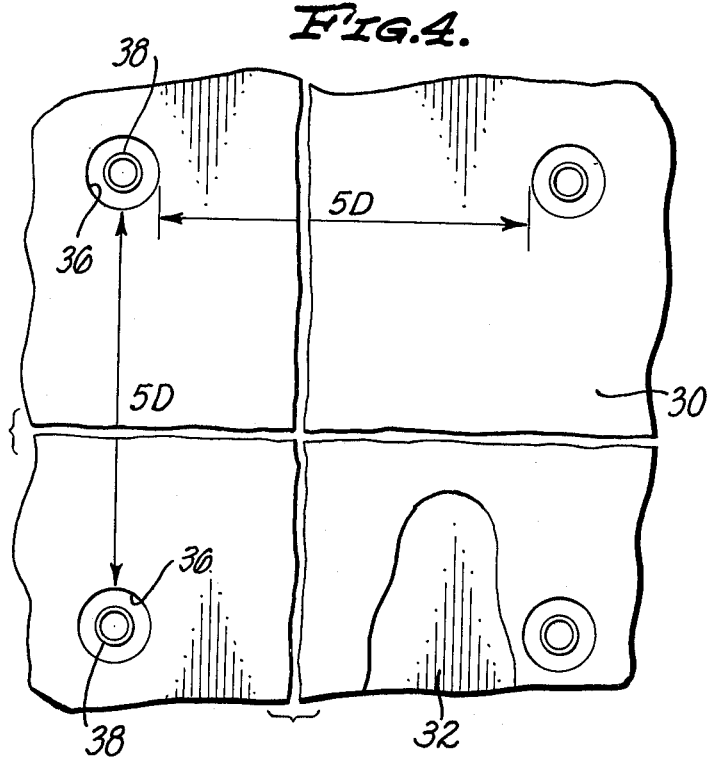
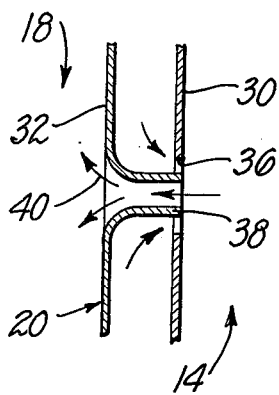
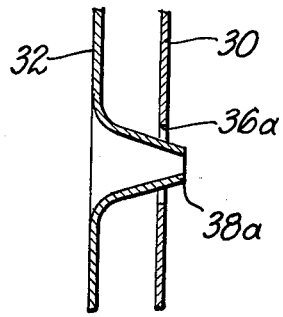
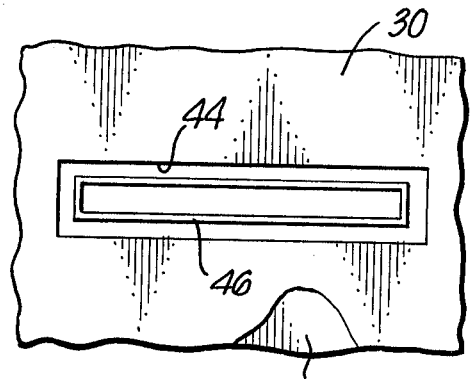
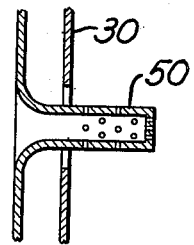
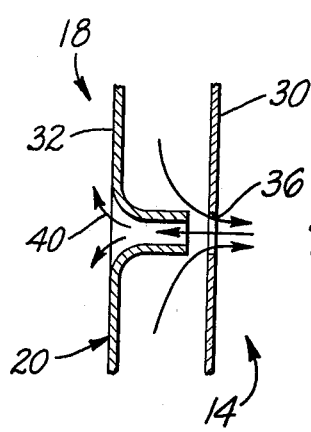

JET MEMBRANE GAS SEPARATOR AND METHOD

The Government has rights in this invention pursuant to Grant Nos. GK-30982 and GK-39083 awarded by the National Science Foundation.

CROSS-REFERENCE TO RELATED APPLICATION

This application is a continuation-in-part of our co-pending application Ser. No. 461,846, filed Apr. 18, 1974, now abandoned.

BACKGROUND OF INVENTION

The present invention relates in general to the separation of gases of differing molecular weights and, more particularly, to a gas separation method and apparatus utilizing a jet membrane.

Background art known to us consists of the following:

| Reference No. | Publications |
|---|---|
| (1) | E. P. Muntz, B. B. Hamel and B. L. Maguire, AIAA J 1651, 8, 9, 1970. |
| (2) | J. Brook and B. B. Hamel, 7th Rarefied Gas Dynamics Symposium, Pisa, 1970. |
| (3) | E. P. Muntz and B. L. Maguire, 7th Rarefied Gas Dynamics Symposium, Pisa, 1970. |
| (4) | J. Brook, B. B. Hamel, E. P. Muntz, 8th Rarefied Gas Dynamics Symposium, Stanford, 1972. |
| (5) | P. A. Tahourdin. Final Report on the Jet Separation Methods, Oxford Rept. No. 36, Dr. 694, Claredon Lab., Oxford, England, 1946. |
| (6) | E. W. Becker and K. Bier, Z. Naturforsch, 9a 975–986, 1954. |
| (7) | E. W. Becker, K. Bier, H. Burghoff, O. Hagena, P. Lohse, R. Schutte, P. Turowski, and F. Zigan, Proc. U.N. Intern. Conf. Peaceful Uses At. Energy, 2nd Geneva, 1958 p/102 4, 455–457. |
| (8) | E. W. Becker, Proc. Intern. Symp. Isotope Separation, Amsterdam, 1957, 1958, 560–578. |
| (9) | E. W. Becker in H. London, ed., Separation of Isotopes, George Newness Ltd., London, 1961, Chap. 9. |
| (10) | P. C. Waterman and S. A. Stern, J Chem. Phys. 31, 405–519, 1959. |
| (11) | V. H. Reis and J. B. Fenn, J Chem. Phys. 39, 3240–3250, 1063 |
| (12) | F. S. Sherman, Phys, Fluids 773, 8, 5, 1965. |
| (13) | R. Camparague, J Chem. Phys. 1795, 52, 4, 1970. |
| (14) | E. P. Muntz, B. B. Hamel and P. B. Scott, Entropie No. 42,1971. |
| (15) | G. Hertz Z. fur Physik 79, 109–121 (1932). |
| (16) | C. G. Maier, Mechanical Concentration of Gases - United States Department of the Interior, Bureau of Mines, Bulletin #431, 1940. |

| Reference No. | U.S. PAT. No. | Inventor(s) |
|---|---|---|
| (17) | 2,607,439 | Dickens et al |
| (18) | 3,279,155 | Lambert |
| (19) | 3,320,722 | Lucas |
| (20) | 3,362,131 | Becker et al |
| (21) | 3,583,633 | Campargue |
| (22) | 3,616,596 | Campargue |
| (23) | British Pat. No. 794,834 | |

The jet membrane separation apparatus and process of the invention are based on different physical phenomena than other jet related separation schemes. However, since these schemes have some family relationship because of their use of jets, they are reviewed in this section. A technical description of the phenomena on which the jet membrane separation process depends is given in References 1 to 4 and 14.

The first report of separation in an expanding free jet was by Tahourdin (Reference 5) at Oxford, England in 1946. A mixture of gaseous species with disparate molecular weights was expanded through a nozzle into a region of low ambient pressure. The initial observation was that the heavier species was enriched along the centerline, while the lighter species was more abundant off-centerline. The effect was rediscovered by Becker (Reference 6) in 1954. Becker and his associates (References 7, 8 and 9) published a number of papers on this effect in the period of 1954 to 1963. In addition, Waterman and Stern (Reference 10) reported similar observations in 1959. The difficulty with these observations was that no theoretical model existed which could unify and explain the underlying mechanism. Also, certain of these experiments were performed with somewhat different configurations of nozzle and collector.

Between 1960 and 1965, the work of Fenn and associates (Reference 11) and Sherman (Reference 12) brought the earlier observations into clearer focus. Fenn, in a series of experiments, established that the observed separation phenomena was a collector or probe effect. An expanding mixture of gases showed very little actual separation. This conclusion was supported by the theoretical analysis of Sherman (Reference 12). Sherman utilized a hydrodynamic diffusion analysis to show that in the region of the expanding jet that could be described by continuum concepts, there was indeed very small separation. Further, unpublished work by one of the present investigators (Hamel) showed that in the non-continuum region of the flow, the thermal motion of the gas was so small that little off-centerline separation could be expected. By the late 1960's there was rather convincing evidence that little, if any, separation could be expected by expanding a gas mixture into vacuum. Some, but not remarkable, separations could be realized by making use of the probe separation effect (Reference 11). In addition, a definite separation could be obtained by the complex jet-skimmer configuration employed by Becker, the effect being associated with a centrifuging or turning of the jet rather than an expansion per se.

In 1970, Campargue (Reference 13) renewed interest in the problem by reporting a set of observations of large separation effects which resulted from the expansion of gas into a region — not a vacuum — but of low pressure. The really unusual aspect of this experiment was that Campargue put the gas mixture to be separated in the background gas, rather than in the expanding jet. Although Campargue's results represented a significant departure from all other work on free jet separation, there was no explanation for the underlying mechanism.

In discussions with Campargue in July, 1970, it became clear to us that the effect he was observing was attributable not to the structure of the expanding jet, but to the interaction between the background molecules and the expanding jet. In fact, we became convinced that an explanation of the results could be found in a series of papers, viz., Muntz, Hamel and Maguire (Reference 1); Brook and Hamel (Reference 2); Muntz and Maguire (Reference 3) published between 1968 and 1970, in which the foundations for the description of free jet-background interaction were presented. In the Fall of 1970, Muntz and Scott repeated Campargue's experiments at the University of Southern California, and additionally performed a set of experiments with other gases which showed that the separation effect was real, repeatable, and in fact probably even larger than reported by Campargue. These results and a simple theory were reported in the summer of 1971 by Muntz, Hamel and Scott (Reference 14)

OBJECTS AND SUMMARY OF INVENTION

With the foregoing background in mind, the primary object of the present invention is to provide a jet membrane gas separation method and apparatus which efficiently separates the molecules of a lighter gas from those of a heavier gas or gases and which achieves a high degree of purity. In the case of the separation of heavy isotopes, several stages of the type described herein can be cascaded to provide a high degree of enrichment.

More particularly, a basic object of the invention is to provide a jet-membrane gas separation method which involves directing generally annular jets of a jet gas into a gas mixture, and preferentially extracting the lighter or lightest gas or gases from the gas mixture through central zones of the generally annular jets.

Still more particularly, the method of the invention is to provide a jet membrane separating a chamber of the gas mixture from a chamber for gas enriched in the lighter gas or gases, the jet membrane gas expanding from (at least generally) annular orifices communicating with the gas-mixture chamber, with extraction probes centered within the jet orifices and interconnecting the two chambers, with the result that the lighter or lightest gas of the mixture preferentially penetrates the jet membrane and thus enters the extraction probes and passes into the chamber for the lighter or lightest gas or gases.

The term "annular" as used herein means any ring-like opening, whether circular, square, rectangular, or other shape, and even a set of slits such that the ends of the rectangle are eliminated. The term "generally annular" in the same context covers such a ring-like opening which may have minor discontinuities.

The method of the invention provides for separating a lighter gas or gases from a heavier gas or gases in a mixture thereof by means of: directing generally annular jets of a jet gas into the gas mixture and extracting the lighter gas from the gas mixture through central zones of the generally annular jets. These jets are preferably continuous around the central zones and have either subsonic or supersonic velocities.

The apparatus of the invention may be summarized as including: a first chamber for the gas mixture; a second chamber for the lighter gas; a jet membrane separating the chambers by means of providing jet orifices communicating with the first chamber; extraction probes at the jet orifices and interconnecting the chambers; means for delivering a jet gas to the jet orifices for discharge therethrough into the first chamber; means for delivering the gas mixture to the first chamber; and means for discharging the lighter gas from the second chamber.

This apparatus provides a jet membrane wall bounding the first chamber and having the jet orifices therein, and a second wall spaced from the first wall and bounding the second chamber and having the extraction probes mounted thereon, and where the space between the aforementioned first and second walls passes the jet gas. The extraction probes are in the form of tubes or truncated tubular cones projecting from the aforementioned second wall toward and aligned with the jet orifices. The extraction probes may project through the jet orifices into the first chamber, may terminate even with the jet orifices, or may terminate upstream of the jet orifices. In a construction where the orifices and extraction probes are circular, the inside diameter of the extraction tubes may be between about 0.25 and 0.90 times the outside diameter of the jet orifices for the case of the probes projecting through the orifices, and for the case of the probes terminating short of the orifices, the probe inside diameter may be the orifice diameter or slightly larger. The probes may project through the orifices into the first chamber by as much as three orifice diameters of may terminate short of the orifices by as much as one orifice diameter.

The foregoing objects, advantages, features and results of the present invention, together with various other objects, advantages, features and results which will be evident to those skilled in the gas separation art in the light of this disclosure, may be achieved with the exemplary embodiments of the invention illustrated in the accompanying drawings and described in detail hereinafter.

DESCRIPTION OF DRAWINGS

In the drawings:

FIG. 3 is a sectional view duplicating a portion of FIG. 1 on an enlarged scale and illustrating the concept of the jet membrane of the invention;

FIG. 4 is an elevational view of the jet membrane, viewed from the right as the jet membrane is shown in FIG. 3;

FIG. 5 is a fragmentary sectional view similar to a portion of FIG. 3, but showing an alternative embodiment;

FIG. 6 is a view similar to FIG. 5, but showing another alternative embodiment;

FIG. 7 is an elevational view showing a rectangular or slit form of embodiment; and FIGS. 8 and 9 are views similar to FIG. 5, showing other alternative embodiments.

DESCRIPTION OF PHYSICAL MECHANISM OF INVENTION

Figure 1:
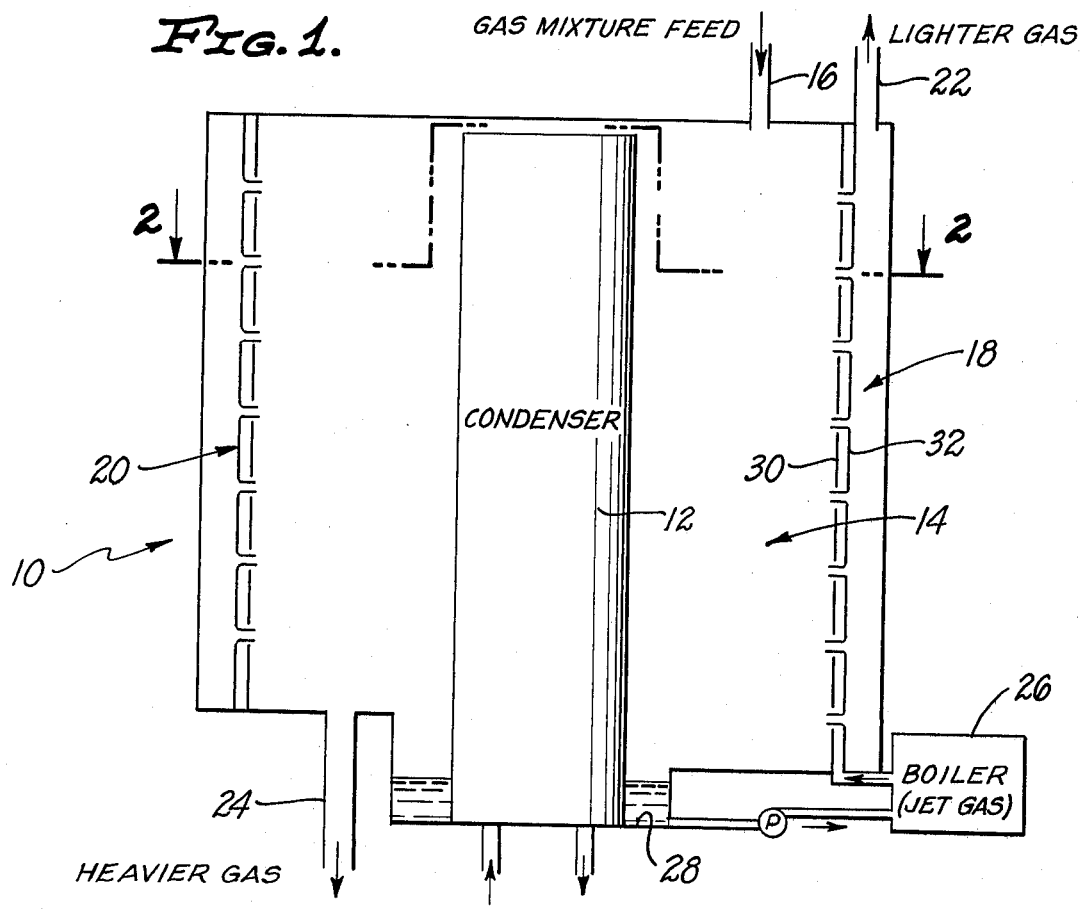
FIG. 1 is a schematic vertical section view of a gas separating apparatus which embodies the invention and which is capable of performing the method thereof.

Before considering the invention in detail, it might be well to describe first the basic separation mechanism applied in the invention, using a simplified approach. To discuss what we believe to be the dominant mechanism for separation, first consider a simple example. If a molecular beam composed of two species 1 and 2 passes through a stationary gas, c, then for each species of the beam an exponential scattering will take place. The beam densities decay with distance according to the equations:

$$\frac{n_1}{n_{1_\infty}} = e^{-x/\lambda_{1c}}, \quad \frac{n_2}{n_{2_\infty}} = -x/\lambda_{2c} \tag{1}$$

where $n_{1_\infty}$ and $n_{2_\infty}$ represent the values of species density in the undisturbed beam, and $\lambda_{1c}$ and $\lambda_{2c}$ represent the mean free paths of 1 and 2 molecules, respectively as they pass through the stationary gas, c. Then $$\frac{n_1}{n_2} = \frac{n_{1_\infty}}{n_{2_\infty}} e^{-x(1/\lambda_{1c}-1/\lambda_{2c})} \tag{2}$$

If the molecular size of molecule 1 1 smaller than that of 2, $\lambda_{2c} \lambda_{1c}$ and we would observe enrichment of the beam in the smaller species, this separation would in fact be exponential as one moved down the beam.

The foregoing represents a simple case in which an exponentially large separation can be made to occur. While attractive in principle, the molecular beam flux is small and hence the economics are prohibitive for a separation application. Instead, a flow is created in which a situation that approaches beam scattering is established but at higher fluxes.

In our investigation of the diffusion of the background molecules into a free jet, we have discovered that collisions with the jet molecules generally preferentially remove molecules which are not moving radially toward the source. This results in the background gas in a sense becoming a molecular beam which moves along radial rays toward the source. Such a view of background-jet interaction was first proposed by Muntz, Hamel and Maguire (Reference 1) and has since been substantiated by a more complete kinetic treatment and a large number of experiments.

If the background molecules comprise a mixture of two species, then along each radial ray there would develop a molecular beam composed of the two background species. However, the ordered velocity of each species, $i$, would be approximately $(2kT_b/m_i)^{\frac{1}{2}}$, where $T_b$ is the background or gas mixture temperature. The lighter and hence faster species would penetrate further into the counterflowing jet. One could therefore anticipate that along each ray, separation would occur, growing exponentially as one proceeds to the jet origin. This is, in fact, what we observe. In effect, the free jet mixture interaction creates a molecular beam, jet gas scattering situation. However, because the jet or carrier gas is not stationary, the separation obtained depends on the species speeds and intermolecular cross section. An analysis for the background or mixture density in the free jet gives the simple dependence upon distance R from the jet origin:

$$n_{b_1} = (n_{b_1})_\infty \, e^{-R_p/R} \quad (3)$$

where $(n_{b_1})_\infty$ is the density of the background gas far from the nozzle, and $R_p$ a penetration distance for a background molecule, which dependence has been confirmed by experiment.

Using this simple idea with two gases in the background mixture, we obtain for the unit separation:

$$\alpha = \frac{n_{b_1}}{n_{b_2}} = \left(\frac{n_{b_1\infty}}{n_{b_2\infty}}\right) \exp\left(\frac{\Delta R_p}{R}\right), \quad (4)$$

where $\Delta R_p$ is the difference in penetration distance of the diffusing components.

Neon isotopes ($Ne_{20}$ and $Ne_{22}$) were separated by this means with a mass spectrometer used to obtain a measure of unit separation $\alpha$ and flux L (mole flow/unit area). The results show an appreciable flux and give a simple expression that relates separation and flux:

$$\frac{\alpha - 1}{(\alpha - 1)_{g.d.}} = \gamma \ln \frac{L_{g.d.}}{L}, \quad (5)$$

where $\gamma$ is a constant, which for neon is 1.7, and ( )$_{g.d.}$ stands for gaseous diffusion. This expression also agrees well with what can be derived from theory using the above equation 4.

In addition to being able to quantify the separation and measure it accurately, it is crucial for any practical separation system to show that an adequate mass flow L of the enriched component can be achieved.

The usefulness of any separation phenomena depends on the unit separation $\alpha$ and the mass flux of material. Thus in separation cascades the stage separation is described by what is called the separative capacity $\delta U = L(\alpha - 1)^2 A/4$, where A is the stage area.

To maximize separative capacity it is of interest to maximize the background or mixture pressure, minimize the jet gas flow, maximize the extraction area, minimize the amount of jet gas extracted with the extraction device, and minimize the jet pressure ratio.

These objectives are best achieved by the extraction configuration shown in FIGS. 1 to 4, which will now be considered in detail.

DESCRIPTION OF EXAMPLARY EMBODIMENTS OF INVENTION

Figure 2:
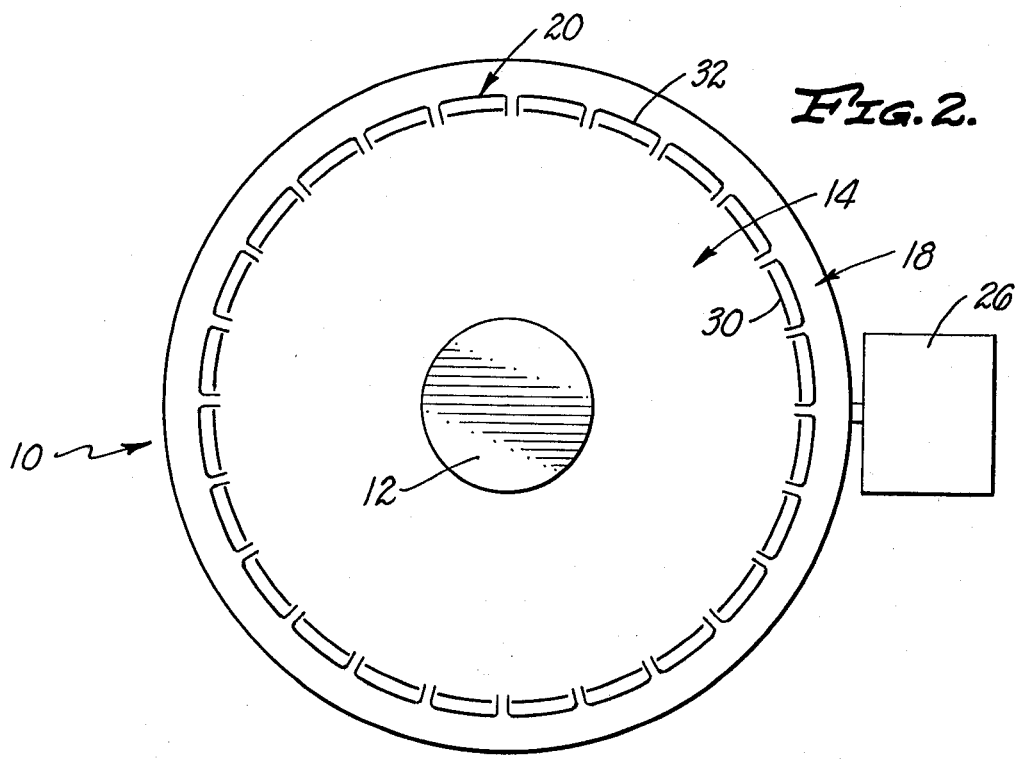
FIG. 2 is horizontal section view taken as indicated by the irregular arrowed line 2-2 of FIG. 1.

Referring initially to FIGS. 1 and 2 of the drawings, the gas separating apparatus of the invention is designated generally therein by the numeral 10 and may be of a generally cylindrical configuration as shown. Centrally located within the apparatus 10, and coaxial therewith, is a condenser 12 cooled for jet gas pumping purposes. Surrounding the condenser is an annular, first chamber 14 for the gas mixture the lighter or lightest fraction of which is to be separated, there being a gas mixture feed 16 in communication with this chamber.

Radially outwardly from the chamber 14 is a second, outer chamber 18 for the lighter or lightest gas in the mixture. An annular jet membrane and an orifice structure, which will be described in detail hereinafter and which generates the jet membrane, separates the two chambers 14 and 18 and functions to pass a percentage of the lighter or lightest gas from the chamber 14 to the chamber 18. This lighter fraction is removed through an outlet 22 while the heavier gas is removed through an outlet 24.

A jet gas, which may be a vapor derived from a fluid which is normally in its liquid phase, is delivered to the jet orifices by a boiler 26 receiving the liquid phase from a sump 28 located at the bottom of the gas-mixture chamber 14 and surrounding the condenser 12.

A preferred configuration for the jet membrane structure 20 is shown fragmentarily in FIGS. 3 and 4 of the drawings, and comprises a first wall 30 bounding the chamber 14 and a second wall 32 spaced from the first wall and bounding the chamber 18. The gas mixture or background gas in the chamber 14 is indicated as flowing toward the jet membrane 20 by the arrow array 34 in FIG. 3.

The wall 30 is provided with a plurality of annular jet orifices 36 which are circular and circumferentially continuous in the particular embodiment under consideration. These jet orifices 36 have an outside diameter D and are spaced apart of the order of 5D. The wall 32 carries extraction tubes 38 for the lighter or lightest gas in the mixture, such extraction tubes being positioned at and aligned with the annular orifices 36. The tubes may extend through the orifice as shown in FIG. 3, or may terminate at the orifice as shown in FIG. 5, or may terminate short of the orifice as shown in FIG. 9. The protrusion, L, of the extraction tubes 38 through the orifices may range up to a maximum of the order of three times the jet orifice diameter, D. Preferably, the value of L is of the order of 0.25D, as shown in FIG. 3 of the drawings. The extraction tubes may be short of the orifices up to a maximum of the order of the jet orifice diameter, D. D is preferably of the order of 0.005 centimeters. With further regard to the parameter D, the jet orifice diameter is the choice of the designer. A large D, say one millimeter or more, results in a correspondingly large jet. For the number of collisions to be limited to the same number as for a smaller jet, the working pressure must be decreased as fast as the orifice diameter increases. To keep the mass flow constant, the size of the apparatus must grow as $D^{\frac{1}{2}}$. Thus, for D to grow from 0.1 mm to 1 mm, the size of the jet membrane array would triple. The pumping costs quickly become excessive, as the volume flow in this case would increase by 10. In practice, the choice of D will be bounded by the difficulty of making micro-arrays for the jet membrane on one side, and by pumping cost on the other extreme.

Another structural parameter of significance is that the value of $d$, the inside diameter of the extraction tubes 38, should be between about 0.25D and about 0.90D for best results. An extraction probe area about equal to the jet-orifice area would be useful in practice. For the embodiment of FIG. 9, an extraction probe area slightly in excess of the orifice area may be useful in some applications, such as up to about 1.25D.

Considering the operation of the extraction configuration shown in FIG. 3 of the drawings, the gas mixture from which the lighter or lightest gas is to be separated penetrates into the high speed jets which enter the chamber 14 through the jet orifices 36. The lighter or lightest gas penetrates further than the heavier gas, and preferentially enters the extraction openings formed by the extraction tubes 38 within the jet orifices 36, and flows into the chamber 18, as indicated by the arrows 40. Of course, the heavier gas or gases also enter the chamber 18 to some degree, but the percentage of the lighter or lightest gas entering the chamber 18 is higher. By cascading a number of the extraction configurations shown in FIG. 3, a very high degree of purity of the lighter gases or lightest gas may be achieved.

Considering some additional parameters, for a value for D of the order of 0.005 centimeters, the maximum gas pressure in the gas-mixture chamber 14 should be of the order of 10 millimeters of mercury. For larger values of D, the pressure in the chamber 14 would be less. The separation jet pressure ratio, i.e., the ratio of the pressure in the jet stagnation chamber between the walls 30 and 32 to the gas-mixture pressure in the chamber 14 should be greater than 1, but less than about 10 for efficient operation. Large jet pressure ratios are usable, but generally inefficient.

For the extraction configuration shown in FIG. 3, the value of $R_p$ can be made of the same order as or less than the jet orifice diameter D, thus giving as low as possible a jet stagnation pressure, and consequently the lowest possible jet mass flow. The background or gas-mixture pressure can also be a maximum under these conditions since $R_p$ is small and thus the background pressure can be high for the rarefaction Reynolds Number, $$Re_r = X_m/\lambda,$$

(where $X_m$ is the position of the closure shock and $\lambda$, is the mean free path behind that shock). The plume Knudsen number ($Kn_p$) is directly related to the rarefaction Reynolds Number. The $Kn_p$ is the mean free path of jet molecules in the background gas ratioed to $R_p$, with $\infty > Kn_p > 0.05$ for useful separations. The typical proportions shown in FIG. 3 would allow pressures up to about 10 mm Hg in the background 14 for typical conditions.

By keeping the pressure ratio (P jet/ P background) and hence the scale of the jet flow field small (i.e., on the order of the jet orifice diameter) a further advantage is realized, the spacing between the jet orifices need only be small (about 5 jet orifice diameters) in order to effectively have no significant interference between jets. The total area of a stage is thus minimized.

The type of stage shown in FIG. 1 has a further advantage in that the extraction tubes 38 have a rather low L/D and thus a high permeability or transmission.

Because of the general downstream facing direction of the extraction probe 38, and the high speed jet flow at the mouth of each extraction probe, the mass flow of jet gas entering the probe due to diffusion is minimized.

Evidence that the type of extraction configuration shown here works effectively has been demonstrated by highly efficient separation of the neon isotopes 20 and 22. Tests indicate that the optimum jet membrane separation plant would operate most economically at an $\alpha - 1 = 4(\alpha - 1)_{g.d.}$ and have a total area equal to three times the gaseous diffusion total area. For these operating parameters the capital costs of a jet membrane plant would be about one-half the capital costs of the equivalent diffusion plant. The operating power costs would range from somewhat less to a factor of four less.

The lower power costs result from using low cost waste steam to heat the jet gas boiler and cooling water to pump the jet gas. This is a result of the advantage that the jet gas can be pumped by condensation at slightly above room temperature and vaporized by low temperature steam or by temperature heat from a solar energy absorber. Alternatively, the waste heat from a nuclear reactor power plant would be suitable for vaporizing the jet gas. It is this possibility of using low grade thermal energy for jet gas pumping that makes this process very attractive from an economic and environmental perspective. For uranium isotope separation, a material almost ideally suited for the jet gas purpose is available. It is called N43 or perfluorotributylamine (manufactured by Minnesota Mining and Manufacturing Co.) (i.e., 1 mm Hg vapor pressure at 23° C, 23mm Hg vapor pressure at 85°).

FIG. 6 shows an alternative jet orifice 36a and a complementary probe 38a which is frusto-conical. The conical probe has the advantage of higher conductance for the light gas, which leads to greater separative capacity and hence improved economics.

As previously mentioned, the annular jet orifices and the extraction probes need not be circular. For example, FIG. 7 of the drawings show a jet orifice 44 and an extraction tube 46 which are rectangular. Square, elliptical, and other configurations, may also be used. Further, it is not essential that the annular jet orifices be peripherally continuous, and minor discontinuities may exist. Such discontinuities may, for example, be useful in providing structural interconnections between the outer peripheries of the jet orifices and the extraction tubes.

A final probe configuration using a porous or perforated wall 50 is shown in FIG. 8. Although the probe shown is of cylindrical plug geometry, the perforated wall can just as well be configured as a cone, a smoothly curved shape, or one of the above mentioned slit, rectangular or elliptical configurations.

Although exemplary embodiments of the invention have been disclosed for illustrative purposes, it will be understood that various changes, modifications and substitutions may be incorporated in such embodiments without departing from the invention as hereinafter claimed.

We claim:

1. In an apparatus for separating a lighter gas from a heavier gas in a gas mixture, the combination of:
   a. a first chamber for the gas mixture;
   b. a second chamber for a mixture enriched in the lighter gas;
   c. a wall structure separating said chambers and comprising means providing jet orifices communicating with said first chamber and means providing extraction openings adjacent and aligned with said jet orifices and interconnecting said chambers, said extraction openings having inlet ends communicating with said first chamber and outlet ends communicating with said second chamber, said jet orifices and said inlet ends of said extraction openings facing in the same direction;
   d. means for delivering a jet gas to said jet orifices for discharge therethrough into said first chamber;
   e. means for delivering the gas mixture to said first chamber; and
   f. means for discharging the lighter gas from said second chamber.

2. An apparatus as defined in claim 1 wherein:
   a. said wall structure comprises a first wall bounding said first chamber and having said jet orifices therein, and a second wall spaced from said first wall and bounding said second chamber and having said extraction openings therein; and
   b. said jet gas delivering means comprises the space between said first and second walls.

3. An apparatus according to claim 2, wherein said extraction openings are extraction tubes projecting from said second wall toward said jet orifices.

4. An apparatus as set forth in claim 3, wherein said extraction tubes project through said jet orifices into said first chamber.

5. An apparatus as set forth in claim 3, wherein said extraction tubes are coaxial with and terminate short of said jet orifices.

6. An apparatus as set forth in claim 5, wherein said extraction tubes are spaced from the jet orifices between about zero and about the outside diameter of said jet orifices and have an inside diameter between about 0.25 and 1.25 times the outside diameter of said jet orifices.

7. An apparatus according to claim 3, wherein said jet orifices completely surround said extraction tubes with annular spaces between the edges of said jet orifices and said extraction tubes.

8. An apparatus as defined in claim 3, wherein said jet orifices and said extraction tubes are laterally elongated.

9. An apparatus as defined in claim 3, wherein said jet orifices and said extraction tubes are cylindrical.

10. An apparatus as defined in claim 3, wherein said jet orifices and said extraction tubes are frustoconical.

11. An apparatus according to claim 3, wherein said jet orifices and said extraction tubes are circular in cross section and cylindrical.

12. An apparatus as set forth in claim 11, wherein the inside diameter of said extraction tubes is between about 0.25 and 0.90 times the outside diameter of said jet orifices.

13. An apparatus according to claim 11 wherein said extraction tubes project into said first chamber between about zero and about three times the outside diameter of said jet orifices.

14. A method of separating a lighter gas from a heavier gas in a gas mixture, including the steps of:
   a. directing a generally annular jet of a jet gas into the gas mixture; and
   b. extracting the lighter gas from the gas mixture through a central zone within and surrounded by said generally annular jet, the direction of gas extraction being opposite to the direction of flow of said generally annular jet.

15. A method according to claim 14 wherein said generally annular jets have supersonic velocities.

16. A method according to claim 14 wherein said generally annular jets have subsonic velocities.

17. A method as defined in claim 14 wherein said generally annular jets are continuous around said central zones.

18. A method according to claim 17 wherein said jets are circular.

19. A method according to claim 17 wherein said jets are rectangular.

20. In an apparatus for separating a lighter gas from a heavier gas in a gas mixture, the combination of:
   a. a chamber for the gas mixture;
   b. a generally annular jet orifice facing the gas mixture chamber; and
   c. an extraction opening for the lighter gas adjacent and aligned with said jet orifice and having an inlet end facing in the same direction as said jet orifice.

21. An apparatus as defined in claim 20 wherein said extraction opening is positioned within and surrounded by said jet orifice.

22. An apparatus as defined in claim 21 wherein said extraction opening is projecting through said jet orifice.

23. An apparatus as defined in claim 20 wherein said extraction opening is spaced from said jet orifice.

* * * * *